Sept. 7, 1937.  H. JUNGHANS  2,092,216
BALANCE SPRING ARRANGEMENT FOR CLOCKWORKS
Filed Nov. 10, 1936
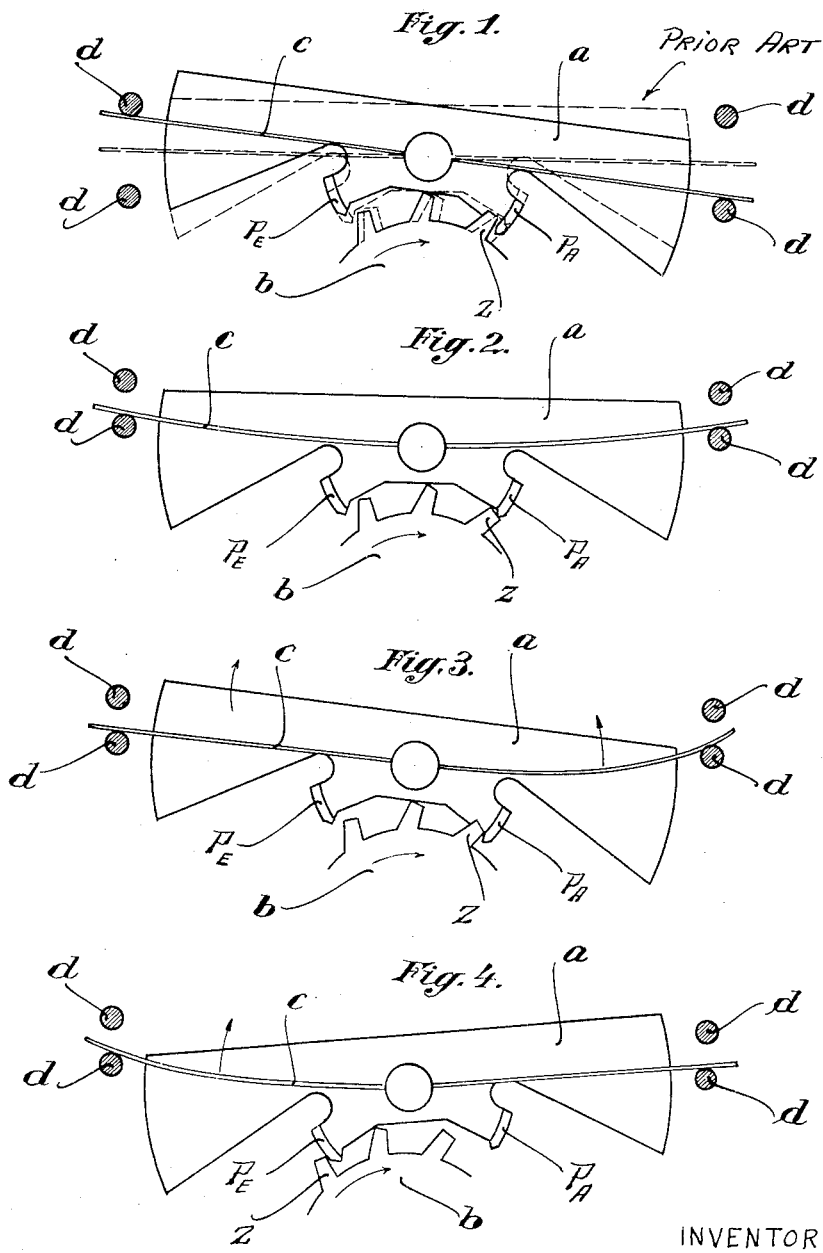
INVENTOR
HELMUT JUNGHANS
By Young, Emery & Thompson
ATTORNEYS Patented Sept. 7, 1937

2,092,216

UNITED STATES PATENT OFFICE 2,092,216

BALANCE SPRING ARRANGEMENT FOR CLOCKWORKS

Helmut Junghans, Schramberg-Sulgen, Eckenhof, Germany

Application November 10, 1936, Serial No. 110,186
In Germany August 3, 1935

2 Claims. (Cl. 58—117)

This invention relates to balance spring arrangements for clockwork or other wheel-work mechanisms.

It is well known in the case of escapement in which the balance spring is constructed in rod-like form that this spring upon the reciprocatory movement must be capable of a certain longitudinal displacement in relation to the stop and guide pins between which the balance spring is mounted at its ends. The spring must accordingly be located with play between each of the two pairs of pins or the particular form of guide, such as slots, which may be selected. Experience has shown that in the case of clockwork or other wheel-work mechanisms having a rod-like balance spring, the anchor in the condition of rest and so long as no force acts on the balance wheel is capable, by reason of jolts occurring during transport, etc., of taking up within the free play available between the balance spring and its guiding means a position of such kind in relation to the escape wheel that pallet and tooth come to rest, and when force is applied they remain stationary in this position. Thus the mechanism is unable to start. In those cases in which merely a weak force is available for driving the mechanism and a weak balance spring requires to be employed it may occur that owing to the play the force in the stationary position, with the balance swung out, is not sufficient or is sufficient only to an unsatisfactory degree again to lift the pallet out of the escape wheel, the escapement acting either not at all or only in defective manner.

It is the object of the invention to overcome these drawbacks. It is based on the recognition that the detrimental play may be eliminated by fitting in the balance spring with slight preliminary tension, in such fashion that when the escape wheel is relieved it adjusts the anchor in a middle position (for lift) in relation to the escape wheel. By reason of this measure it is ensured that the mechanism immediately commences to run when force is applied to the escape wheel, and that even in the case of a weak balance spring there is always sufficient force available for overcoming the stationary condition. At the same time the preliminary tension of the spring may be selected to be so small that any fatigue on the part of the spring in the event of the mechanism being stored for some length of time is quite out of the question.

A possible form of embodiment of a clockwork escapement in accordance with the invention is illustrated in the drawing, which shows as side views different relative positions of the balance and escape wheel in Figs. 1 to 4.

Fig. 1 shows the balance $a$ which has moved out of the correct middle or lifting position (shown in broken lines) into the faulty position of rest (shown in full lines) in relation to the escape wheel $b$. This is possible on account of the free play possessed by the ends of the balance spring $c$ between the guide pins $d$. It is to be observed that no force acts as yet on the escape wheel $b$. This figure is merely intended to illustrate the conditions in purely diagrammatical fashion. Naturally in practice the spacing of the pins $d$ would be reduced as far as possible without the possibility, however, of overcoming in this way the drawbacks referred to.

Fig. 2 shows the balance $a$ in a middle position in relation to the escape wheel $b$. The pallet PA is situated for lift with respect to the tooth $z$ of the escape wheel. It is assumed that no force acts on the escape wheel $b$. Obviously the mechanism must immediately commence to move when force is applied. It is ensured that the balance always has the tendency to assume exactly the middle position shown without any play by the fact that the balance spring $c$ is fitted with slight preliminary tension. Obviously free play which exists between the guide pins $d$ will now be unimportant. The preliminary tension may be made so small that fatigue of the spring is unable to occur even if the mechanism is stored away for a very long period of time.

Figs. 3 and 4 show two phases during the operation of the escapement, there being shown the relative positions of escape wheel and balance with the outgoing and leading pallets in the position of rest. In Fig. 3 the outgoing pallet PA and the tooth $z$ of the balance wheel are at rest and the right hand arm of the balance spring $c$ is greatly tensioned while the left hand arm is only weakly tensioned, and a sufficient force is available to lift the balance in the direction of the arrow shown in the drawing.

In Fig. 4 there are shown the same conditions in exact reversal to Fig. 5. In this case the leading pallet PE is at rest. The arrow on the escape wheel indicates that a force is now acting on the same.

The improvement relating to a clockwork escapement according to the invention will be found to be particularly favourable in the case of mechanisms which operate with a very small operating force.

Having now particularly described and ascertained the nature of my said invention, and in what manner the same is to be performed, I declare that what I claim is:

1. A device of the character described, comprising an escape wheel having teeth thereon, a balance having pallets thereon adapted to engage alternately in front of the teeth of the said escape wheel, and spring means under constant slight tension for constantly urging the said pallets into a middle position in relation to the said escape wheel when the escape wheel is relieved of any force acting thereon.

2. A device of the character described, comprising an escape wheel having teeth thereon, a balance having pallets thereon adapted to engage alternately in front of the teeth of the said escape wheel, and a flat balance spring fitted with slight preliminary tension on the balance for urging the said pallets into a middle position in relation to the said escape wheel when the escape wheel is relieved of any force acting thereon.

HELMUT JUNGHANS.